United States Patent
Call et al.

(10) Patent No.: US 7,478,747 B2
(45) Date of Patent: Jan. 20, 2009

(54) RETAIL SALES AND DISPENSING FUEL MANAGEMENT SYSTEM

(76) Inventors: William Call, 1610 Allred Rd., Afton, WY (US) 83110; Kristen Call, 2609 E. Fairfield St., Mesa, AZ (US) 85213

( * ) Notice: Subject to any disclaimer, the term of this patent is extended or adjusted under 35 U.S.C. 154(b) by 283 days.

(21) Appl. No.: 11/064,276

(22) Filed: Feb. 23, 2005

(65) Prior Publication Data

US 2005/0192832 A1    Sep. 1, 2005

Related U.S. Application Data

(60) Provisional application No. 60/548,066, filed on Feb. 26, 2004.

(51) Int. Cl.
    *G06F 17/00* (2006.01)
(52) U.S. Cl. .................. 235/375; 235/380; 235/379; 705/69; 705/77
(58) Field of Classification Search ............. 235/375, 235/379, 380, 381, 487; 705/39, 44, 72–79, 705/69
See application file for complete search history.

(56) References Cited

U.S. PATENT DOCUMENTS

| | | | |
|---|---|---|---|
| 5,329,589 A | 7/1994 | Fraser et al. | |
| 5,790,790 A | 8/1998 | Smith et al. | |
| 5,826,241 A | 10/1998 | Stein et al. | |
| 6,029,150 A | 2/2000 | Kravitz | |
| 6,192,407 B1 | 2/2001 | Smith et al. | |
| 6,227,447 B1 | 5/2001 | Campisano | |
| 6,351,739 B1 | 2/2002 | Egendorf | |
| 6,882,900 B1* | 4/2005 | Terranova | 700/237 |
| 6,976,008 B2 | 12/2005 | Egendorf | |
| 7,082,406 B1* | 7/2006 | Dickson | 705/24 |
| 7,103,577 B2 | 9/2006 | Blair et al. | |
| 7,309,003 B2 | 12/2007 | Algiene et al. | |
| 2003/0197060 A1* | 10/2003 | Coyner | 235/381 |
| 2003/0220835 A1* | 11/2003 | Barnes, Jr. | 705/14 |
| 2004/0200897 A1* | 10/2004 | Demere | 235/380 |
| 2005/0182681 A1* | 8/2005 | Bruskotter et al. | 705/15 |
| 2005/0187841 A1* | 8/2005 | Grear et al. | 705/35 |

OTHER PUBLICATIONS

U.S. Appl. No. 10/162,050, filed Jun. 4, 2002, Dodson.
U.S. Appl. No. 60/295,984, filed Jun. 5, 2001, Dodson.

* cited by examiner

*Primary Examiner*—Edwyn Labaze
(74) *Attorney, Agent, or Firm*—Workman Nydegger

(57) ABSTRACT

The present invention extends to managing the dispensing of petroleum products. A kiosk (e.g., at a gas station) and fuel management system are connected over a network. The fuel management system maintains balances for fuel purchasing accounts that can be debited to purchase fuel. To purchase fuel, a customer enters credentials identifying a fuel purchasing account at the kiosk. After fueling is complete, the fuel purchasing account is debited by the amount of the fuel purchase. Embodiments of the fuel system can also include networked (e.g., Internet) based payments into a fuel purchasing account, either from a kiosk or from a personal computer. Consumers can pay for increased amounts of fuel, such as, for example, multiple tanks of gasoline, in a single payment, potentially reducing or even eliminating returned check losses and/or card fees associated with "tank-at-a-time" purchases.

40 Claims, 8 Drawing Sheets

Account History

| My Account | Account Info. | Edit Account | Account History |

Transaction Type ▸

From  Month May ▸  Day 4 ▸  Year 2004 ▸

To  May ▸  4 ▸  2004 ▸

| Date | Location | Price | Pumped | Coupon | Total | Payment |
|---|---|---|---|---|---|---|
| 05/04/04 | Station #1 | 1.699/gal. | 7.2 gal. | | $12.232 | Fuel Account |
| | | | | | | |
| | | | | | | |

RETAIL SALES AND DISPENSING FUEL MANAGEMENT SYSTEM

CROSS-REFERENCE TO RELATED APPLICATIONS

The present application claims priority to U.S. Provisional Patent Application Ser. No. 60/548,066, filed Feb. 26, 2004, and entitled "Fuel Marketing System", which is herein incorporated by reference in its entirety.

BACKGROUND OF THE INVENTION

1. The Field of the Invention

The present invention relates to the sale of, distributing, and managing petroleum products and, more particularly, to retail sales and dispensing fuel management system.

2. The Relevant Technology

At the majority of retail locations that sell petroleum products an attendant is required. The attendant, in addition to accepting payment for the products sold, supervises the use of the pumps and assures that each customer makes payment for fuel pumped. Although most retail locations offer pay-at-the-pump facilities, the option to pay inside is also typically available. Because of the option to pay either inside or at the pump an attendant is required to monitor the pump island and to assure that all customers pay for fuel before leaving the premises. To compensate for attendant costs, retailers typically pass on the cost of attendant wages and benefits to consumers by increasing the price of the fuel. Thus attendant costs are paid for by the consumers who purchase fuel, whether they pay the attendant inside or at the pump.

There are typically various payment methods used to pay for fuel. For example, most retail locations that sell fuel accept cash, credit cards, and debit cards as valid forms of payment. At least some retail locations also accept checks as a valid form of payment. As stated, in most cases payment can be made either to a sales attendant or at the pump. In most retail locations, a sales attendant can appropriately process any acceptable form of payment including cash, check, credit card, or debit card.

Unfortunately, the acceptance of checks as a valid form of payment subjects retailers to returned check losses. Thus, retailers typically factor some amount of returned check losses into the cost of doing business. To compensate for the cost of returned checks, retail locations typically pass these costs on to consumers by increasing the price of the gasoline they sell. Thus, at least to some extent, returned check losses are paid for by any consumer who purchases fuel, even consumers that pay by cash, credit card, or debit card.

In the case of payment made using a credit or debit card inside a retail store, a sales attendant swipes the card (through some interface) as a form of payment. Information is read off of the card's magnetic strip and submitted to a card authorization network. When the card is a debit card, the consumer may also enter a PIN (through the interface) at the pump. If the swiped card is approved the transaction can be completed.

However, submitting payment to a sales attendant (whether using cash, check, credit card, or debit card) typically requires a consumer to leave their vehicle unattended for some amount of time (e.g., to walk inside a structure some distance from the pumps). This poses a security risk to the vehicle (which depending on location may be more or less substantial), an inconvenience to the customer, and in inclement weather exposure that may be detrimental to the customer.

Pay at the pump fuel dispensing provides consumers with the convenience of not having to enter a store and leave their vehicle unattended to pay for dispensed fuel. A consumer swipes a debit or credit card at the pump (through some interface) as a form of payment. Information is read off of the card's magnetic strip and submitted to a card authorization network. When the card is a debit card, the consumer may also enter a PIN (through the interface) at the pump. If the swiped card is approved, the consumer can then manually activate the pump (e.g., select grade and remove fuel dispensing nozzle) and dispense fuel into their vehicle.

Although the use of a credit or debit card eliminates the risk of bad check losses, there is typically some fee (e.g., including card authorization network costs and other costs) associated with card acceptance (either when paying a sales attendant or when paying at the pump). Retail locations typically pass card fees on to consumers by increasing the price of the fuel they sell to compensate for the card fees. Thus, at least to some extent, card fees are paid for by any consumer who purchases gasoline, even consumers that pay in cash or use a check.

Further, card fees are assessed each time the card is used. Thus each time a consumer uses a credit or debit card to purchase fuel (either at the pump or checkout counter), a card fee is accessed. Unfortunately, most retail locations only accept credit cards and debit cards at the pump and typically have no mechanism for accepting cash or other forms of payment at the pump. Nonetheless, due in large part to convenience, consumers frequently use credit cards and debit cards to pay at the pump as opposed to submitting payment to a sales attendant.

Credit/debit card purchases can under some circumstances be charged back to retailers. When a chargeback occurs, the retailer is liable for the entire amount of the purchase, a cost that is also usually passed on to consumers in the form of higher fuel prices.

Fuel payments made in cash eliminates the risk of returned checks and eliminates credit and debit card fees and charge backs. However, considerable expense is incurred by retailers in handling cash including for example attendant or cashier costs, inaccuracies in giving back change, safe and related security costs, the cost of taking cash to the bank, and theft loses. These expenses, regularly incurred by retailers, are passed on to consumers in the form of higher fuel prices.

Further, regardless of selected payment method, general consumers are typically limited to purchasing fuel through "tank-at-a-time" transactions. Thus, virtually every consumer fuel purchase results in some cost to the retailer in addition to the cost of the purchases fuel.

Additionally, there is typically no efficient way for a consumer to manage and keep records of all their fuel purchases. Depending on the form of payment some recordkeeping devices may be available, such as, for example, bank statements and credit card invoices. However, no single recordkeeping device is available to customers who use multiple forms of payment at different times such as, for example, cash, checks, and credit/debit cards. Some petroleum company credit cards and fleet cards provide record keeping services and invoices but require a consumer to make all fuel purchases using the card. Further, the administrative cost of compiling and mailing invoices is passed on to retailers usually in the form of higher fuel prices charged by the petroleum company. The higher fuel prices are then passed by the retailer on to consumers.

Accordingly, as a result of present technology and customary methods of payment for fuel purchases, all consumers are required to pay more for fuel, since retail locations typically recoup attendant costs, bad check losses, credit/debit card fees and chargebacks, cash handling costs, and oil company credit card/fleet card costs by increasing the price of fuel. Further, typical fuel payment mechanisms do not provide consumers who purchase fuel using multiple payment methods the means to track purchases, establish fuel budgets, and manage funds used for the purchase of fuel. Accordingly, what would be advantageous are systems, methods, computer program products, that provide pay-at-the-pump convenience, reduce the monetary overhead associated with fuel purchases, and consolidate fuel purchasing information.

BRIEF SUMMARY OF THE INVENTION

The foregoing problems with the prior state of the art are overcome by the principles of the present invention, which are directed towards methods, systems, and computer program products for managing the dispensing of petroleum products. A kiosk (e.g., at a gas station) receives account credentials (through a user-interface) corresponding to a petroleum purchasing account. The kiosk submits the account credentials (e.g., across the Internet) to a petroleum management system.

The petroleum management system receives the account credentials from the kiosk. The account credentials indicate an attempt to purchase petroleum products against the balance of a petroleum purchasing account. The petroleum management system identifies a corresponding petroleum purchasing account based on the received account credentials. The petroleum management system accesses petroleum purchasing account information for the corresponding petroleum purchasing account from an account database. The petroleum management system sends at least an account balance for the petroleum purchasing account (e.g., across the Internet) to the kiosk.

The kiosk receives the account balance for the petroleum purchasing account from the petroleum management system. The kiosk configures a petroleum product dispenser (e.g., a gasoline pump) to dispense a petroleum product based on the account balance for the petroleum purchasing account being sufficient. The kiosk receives an indication of an amount of the petroleum product that was dispensed at the petroleum product dispenser. The kiosk calculates the cost of the dispensed petroleum product.

The kiosk sends a debit message (e.g., across the Internet) to the petroleum management system. The debit message indicates that the petroleum purchasing account is to be debited by the calculated cost. The petroleum management system receives the debit message from the kiosk. The debit message indicates to the petroleum management system that a specified amount in petroleum products was purchased against the balance of the petroleum purchasing account. The petroleum management system debits the petroleum purchasing account by the specified amount in response to receiving the debit message.

Embodiments of the petroleum product management system can also include networked (e.g., Internet) based payments into a petroleum purchasing account, either from a kiosk or from a personal computer. Consumers can pay for larger quantities of petroleum products, such as, for example, multiple tanks of gasoline, in a single payment, potentially reducing or even eliminating returned check losses and/or card network fess associated with "tank-at-a-time" purchases. Embodiments of the petroleum products management system also include remotely monitored and controlled attendant-free fuel dispensing, pump/street sign price changing, electronic message board management, real-time sales monitoring, and data collection and bookkeeping summarization, each potentially reducing overhead associated with selling petroleum products.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 5B, 5C, and 5D depict some of the user-interface screens that can be presented at the Kiosk in FIG. 5A.

DETAILED DESCRIPTION OF THE PREFERRED EMBODIMENTS

Figure 1:
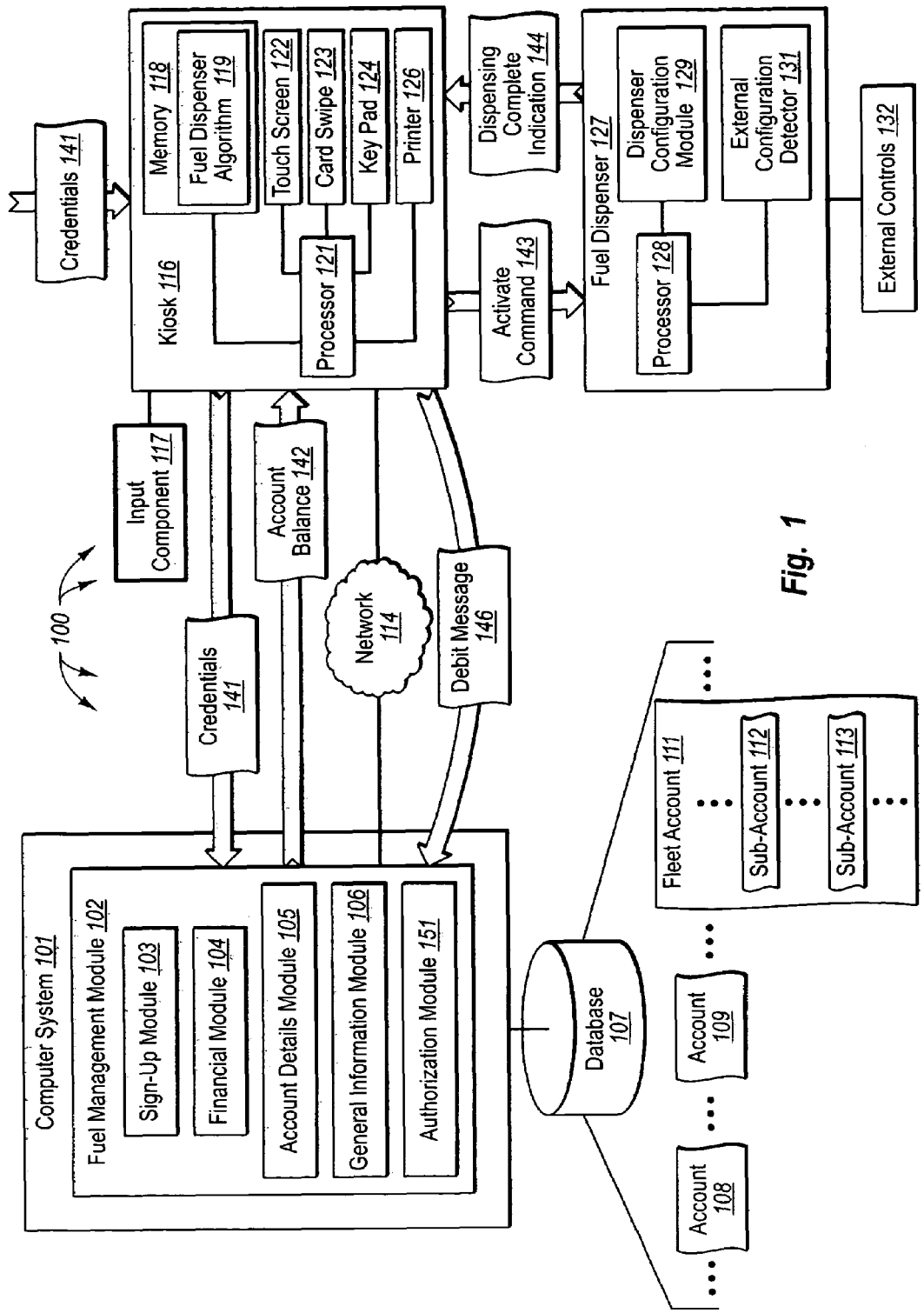
FIG. 1 illustrates an example computer architecture for managing the dispensing of petroleum products.

The principles of the present invention provide for managing the dispensing of petroleum products. A kiosk (e.g., at a gas station) receives account credentials (through a user-interface) corresponding to a petroleum purchasing account. The kiosk submits the account credentials (e.g., across the Internet) to a petroleum management system.

The petroleum management system receives the account credentials from the kiosk. The account credentials indicate an attempt to purchase petroleum products against the balance of a petroleum purchasing account. The petroleum management system identifies a corresponding petroleum purchasing account based on the received account credentials. The petroleum management system accesses petroleum purchasing account information for the corresponding petroleum purchasing account from an account database. The petroleum management system sends at least an account balance for the petroleum purchasing account (e.g., across the Internet) to the kiosk.

The kiosk receives the account balance for the petroleum purchasing account from the petroleum management system. The kiosk configures a petroleum product dispenser (e.g., a gasoline pump) to dispense a petroleum product based on the account balance for the petroleum purchasing account being sufficient. The kiosk receives an indication of an amount of the petroleum product that was dispensed at the petroleum product dispenser. The kiosk calculates the cost of the dispensed petroleum product.

The kiosk sends a debit message (e.g., across the Internet) to the petroleum management system. The debit message indicates that the petroleum purchasing account is to be debited by the calculated cost. The petroleum management system receives the debit message from the kiosk. The debit message indicates to the petroleum management system that a specified amount in petroleum products were purchased against the balance of the of the petroleum purchasing account. The petroleum management system debits the petroleum purchasing account by the specified amount in response to receiving the debit message.

Embodiments of the petroleum product management system can also include networked (e.g., Internet) based payments into a petroleum purchasing account, either from a kiosk or from a personal computer. Consumers can pay for larger quantities of petroleum products, such as, for example, multiple tanks of gasoline, in a single payment, potentially reducing or even eliminating returned check losses and/or card network fess associated with "tank-at-a-time" purchases. Embodiments of the petroleum products management system can also include remotely monitored and control attendant-free fuel dispensing, pump/street sign price changing, an electronic message board management, real-time sales monitoring, and data collection and bookkeeping summarization, each potentially reducing overhead associated with selling petroleum products.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a computer network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in computer network environments with many types of computer system configurations, including, personal computers, laptop computers, hand-held devices, multi-processor systems, network PCs, minicomputers, mainframe computers, kiosks, computerized fuel dispensers, PDAs, and the like. The invention may also be practiced in distributed system environments where local and remote computer systems, which are linked (either by hardwired data links, wireless data links, or by a combination of hardwired and wireless data links) through a computer network, both perform tasks. In a distributed system environment, program modules may be located in both local and remote memory storage devices.

FIG. 1 illustrates an example computer architecture 100 for managing the dispensing of petroleum products. Generally, computer system 101 and kiosk 116 are communicatively coupled via network 114. Network 114 can be a Local Area Network ("LAN"), Wide Area Network ("WAN"), or even the Internet. Computer systems connected to network 114 can receive data from and send data to other computer systems connected to network 114. Accordingly, computer system 101 and kiosk 116, as well as other connected computer systems (not shown), can create electronic messages and exchange electronic messages (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 114. In some embodiments, computer system 101 and kiosk 116 include Web services that create Simple Object Access Protocol ("SOAP") envelopes, for example, including eXstensible Markup Language ("XML") instructions, and exchange SOAP envelopes over network 114.

Computer system 101 includes fuel management module 102 that can generally control the dispensing of fuel at a plurality of different retail sales locations, where each retail sales location has one or more kiosks and one or more fuel dispensers. Fuel management module 102 includes sign-up module 103, financial module 104, account details module 105, general information module 106, and authorization module 151. Sign-up module 103 can be utilized to create a new petroleum purchasing account (e.g., account 108) for a consumer that will purchase fuel at one or more of the retail sales locations. Sign-up module 103 can include a local interface such that an administrator of computer module 102 can enter new account information for a consumer. Further, sign-up module 103 can include a remote (e.g., Web-based) interface such that a consumer with connectively to network 114 can enter their own account information.

To create a new account, a consumer or administrator can enter account creation information, such as, for example, name, address, and telephone number. After an account is created, the account can be assigned an account number, a user-id, and a passcode (e.g., a password or Personal Identification Number ("PIN")). In some embodiments, a telephone number is used as the user-id. The user-id and passcode can be propagated to the consumer using virtually any communication mechanism, such as, for example, paper mail, electronic mail, or telephone.

Fuel management module 102 can interoperate with database 107 to store newly created accounts in database 107. Database 107 can be configured to store individual consumer accounts, such as, for example, accounts 108 and 109. Generally, an individual consumer account can hold funds budgeted for future fuel purchases for an individual consumer. Database 107 can also be configured to store fleet accounts, such as, for example, fleet account 111. As depicted, fleet account 111 further includes sub-accounts 112 and 113.

Generally, a fleet account can hold funds in one or more sub-accounts that are budgeted for future fuel purchases by one or more corresponding vehicle operators or budgeted for one or more vehicles. A fleet account can include a master account that is controlled by a fleet account administrator and a sub-account for each driver or vehicle in the fleet. The administrator of the master account assigns a PIN and vehicle or driver number to each sub-account. Fuel purchases made using the sub-account are recorded both in the account history of that sub-account and in the history of the master account. Thus, there may be a number of user-ids and passwords associated with a fleet account.

A horizontal sequence of three periods (an ellipsis), before, between, and after accounts 108 and 109 and fleet account 111 represents that other accounts can be included in database 107. A vertical sequence of three periods (a vertical ellipsis) before, between, and after sub-accounts 112 and 113 represents that other sub-accounts can be included in fleet account 111.

Financial module 104 can be configured to receive locally and/or remotely entered payments into an account and to receive locally and/or remotely entered debits to an account. Financial module 104 can interoperate with database 107 to credit and debit the balances of accounts, fleet accounts, and sub-accounts stored in database 107, such as, for example, accounts 108 and 109, fleet account 111, and sub-accounts 112 and 113. Financial module 104 can also be configured to access card and/or check authorization networks for the verification of received account payments. Financial module 104 can also be configured to receive debit messages from kiosks and corresponding debit accounts. Financial module 104 can monitor transactions in essentially real time.

Account details module 105 can be configured to retrieve account information, such as, for example, name, address, telephone number, account balance, list of recent fuel purchases, etc., from database 107. Account details module 105 can send retrieved account information (e.g., in an electronic message) to other computer systems, such as, for example, kiosk 116, other kiosks at the same retail location as kiosk 116, kiosks at other retail locations, or to other personal computers connected to network 114 (e.g., a consumer's business or residence computer system).

General information module 106 can be configured to provide general information related to the fuel management system, such as, for example, contact information for a fuel management system administrator and a listing of retail locations that support the fuel management system. General information module 106 can also be configured to send and/or activate marketing and advertising at a kiosk during fueling.

Authorization module 155 can be configured to receive account holder credentials for a fuel purchasing account, such as, for example, a user-id and password, attempt to authenticate the credentials, and authorize access to the fuel purchasing account when appropriate. In response to authorization, financial module 104 can access financial information for a fuel purchasing account and/or account details module can access other account information. Accessed financial and/or other account information can sent to a requesting computer system, such as, for example, a kiosk or other computer connected to network 114. If a kiosk (e.g., kiosk 116) is requesting access to an account, financial module 104 can check the balance of a fuel purchasing account to determine whether or not the fuel purchasing account has a sufficient account balance to purchase fuel. If the balance is sufficient, computer system 101 can send the account balance and/or an indication that the consumer is authorized to purchase fuel to the requesting kiosk.

Kiosks are positioned near, attached to, or mounted in fuel dispensers. For example, kiosk 116 can be physically positioned near to fuel dispenser 127. Kiosk 116 includes processor 121, memory 118, touch screen 122, card swipe 123, key pad 124, and printer 126. Generally, kiosk 116 receives account holder credentials (e.g., at touch screen 132, key pad 124, or input component 117, for example, an external keyboard) and submits the credentials to computer system 101. Kiosk 116 can also be configured to activate one or more fuel dispensers, such as, for example, fuel dispenser 127. For example, in response to receiving an indication that a fuel purchasing account has a sufficient balance to purchase fuel, kiosk 116 can activate fuel dispenser 127.

Kiosk 116 can also be configured with a card swipe for reading credit and/or debit cards and network connection capabilities for inquiring with card authorization networks for card approval. Thus, consumers that do not have and do not want to create a fuel purchasing account can still dispense fuel.

Printer 126 can be used to print fuel purchasing account information and receipts for purchased fuel.

Fuel dispenser 127 includes processor 128, dispenser configuration module 129, and external configuration detector 131. External configuration detector 131 can detect the external configuration of fuel dispenser 127, such as, for example, detecting whether or not a fuel dispensing nozzle is currently secured to fuel dispenser 127 and detecting the selection of a specified grade of fuel. Processor 128 can receive commands from kiosk 128 and from external configuration detector 131, can process received commands, and can instruct dispenser configuration module 129 to change the internal configuration of fuel dispenser 127 (e.g., to pump fuel from an appropriate underground tank).

For example, in response to an activating command from kiosk 116, detecting a fuel grade selection, and detecting that a fuel nozzle has been removed from fuel dispenser 127, dispenser configuration module 129 can internally configure fuel dispense 127 to dispense the selected grade of fuel. When fueling is complete, for example, when external configuration detector 131 detects that the fuel nozzle has been secured at fuel dispenser 127, fuel dispenser 127 can indicate the amount of fuel that was dispensed to kiosk 116.

Figure 5A:
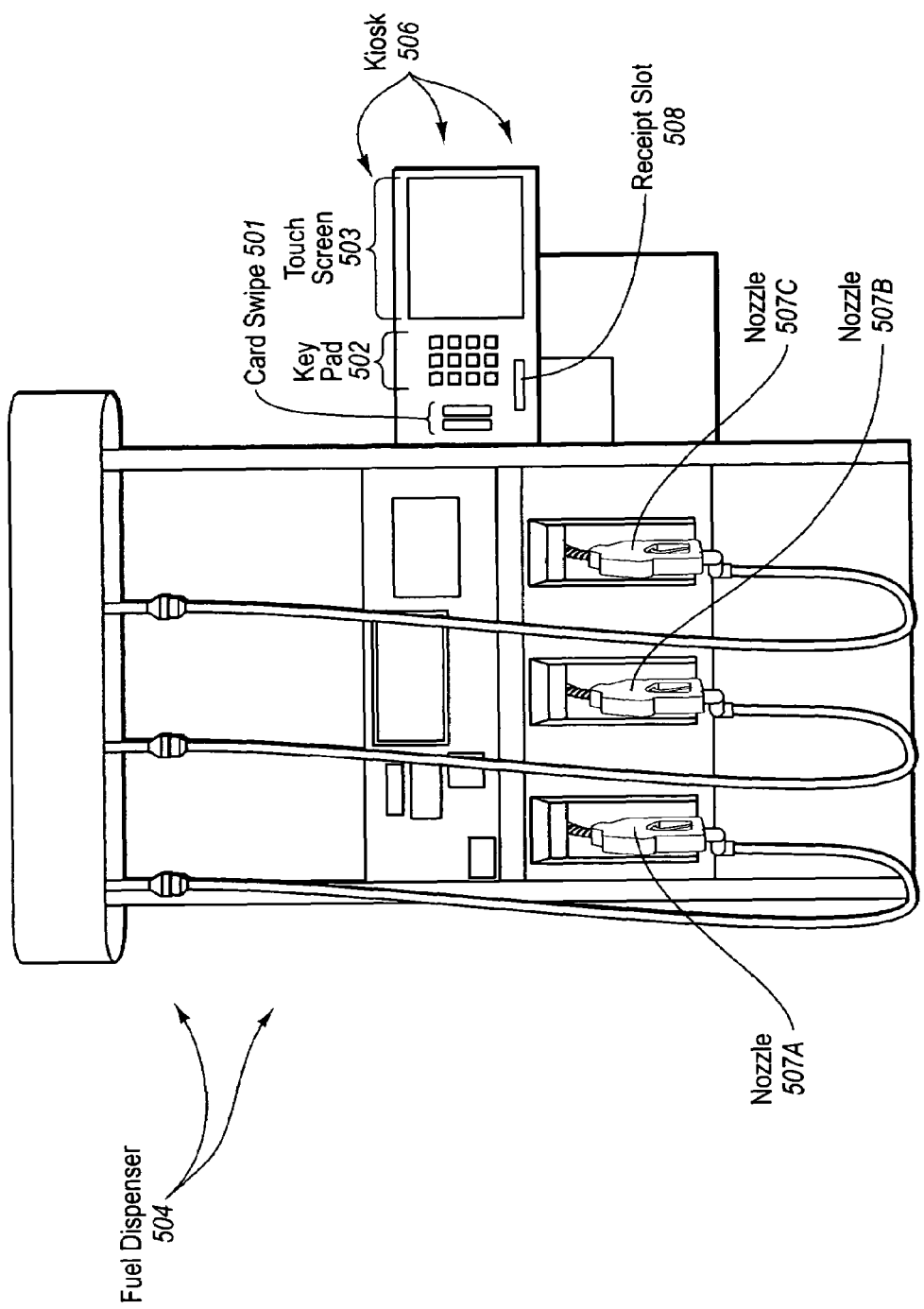
FIG. 5A depicts a fuel dispenser and corresponding kiosk.

FIG. 5A depicts a fuel dispenser 504 and corresponding kiosk 506. As depicted in FIG. 5A, kiosk 506 includes card swipe 501 for swiping credit and debit cards, key pad 502 for entering a user-id and PIN, and touch screen 503 for presenting a user-interface and receiving user selections, an internal printer (e.g., printer 126) for printing receipts, and receipt slot 508 for providing printed receipts to a consumer. Fuel dispenser 504 can also be equipped with an interface for receiving paper currency (not shown).

Figure 5B:
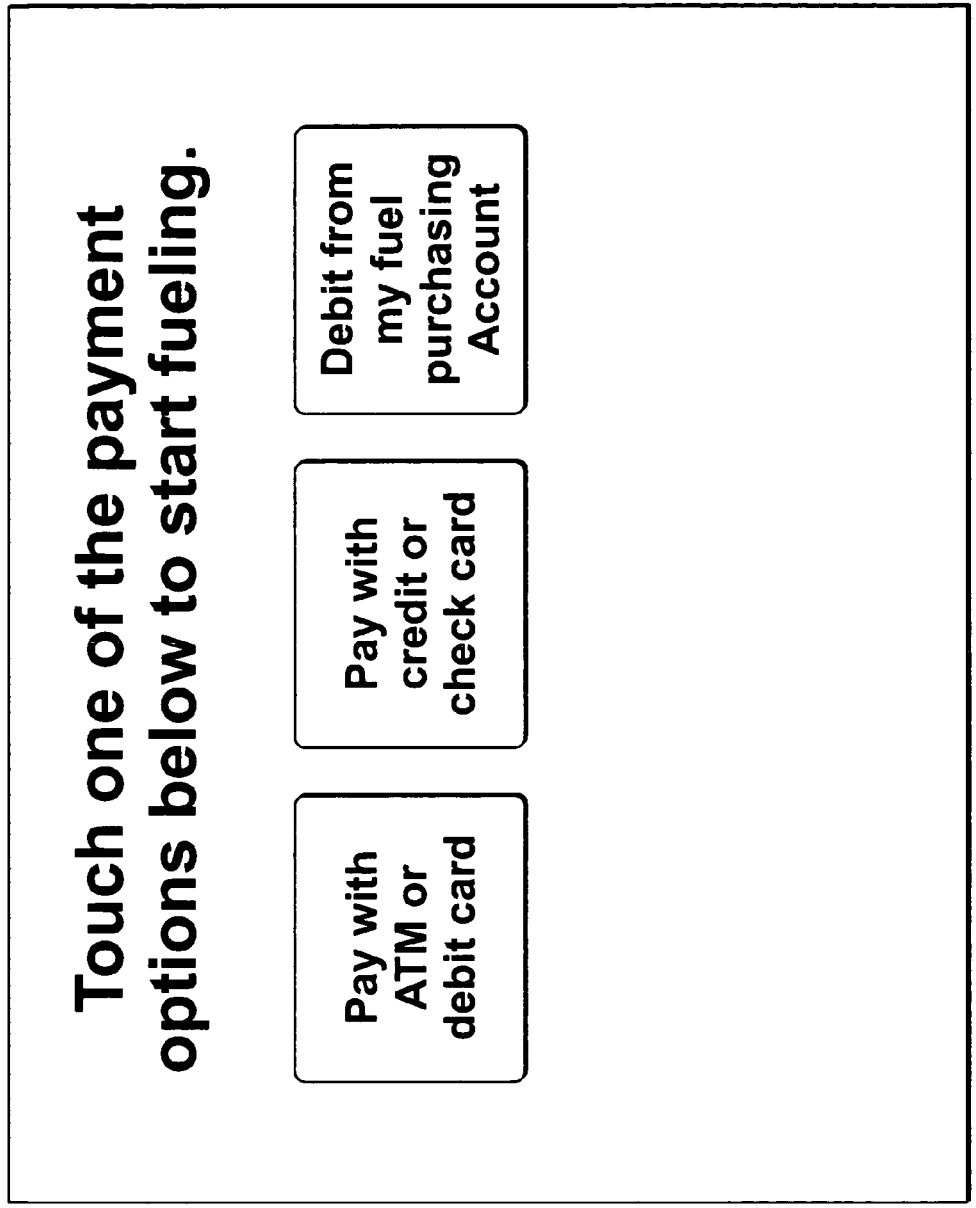
Figure 5C:
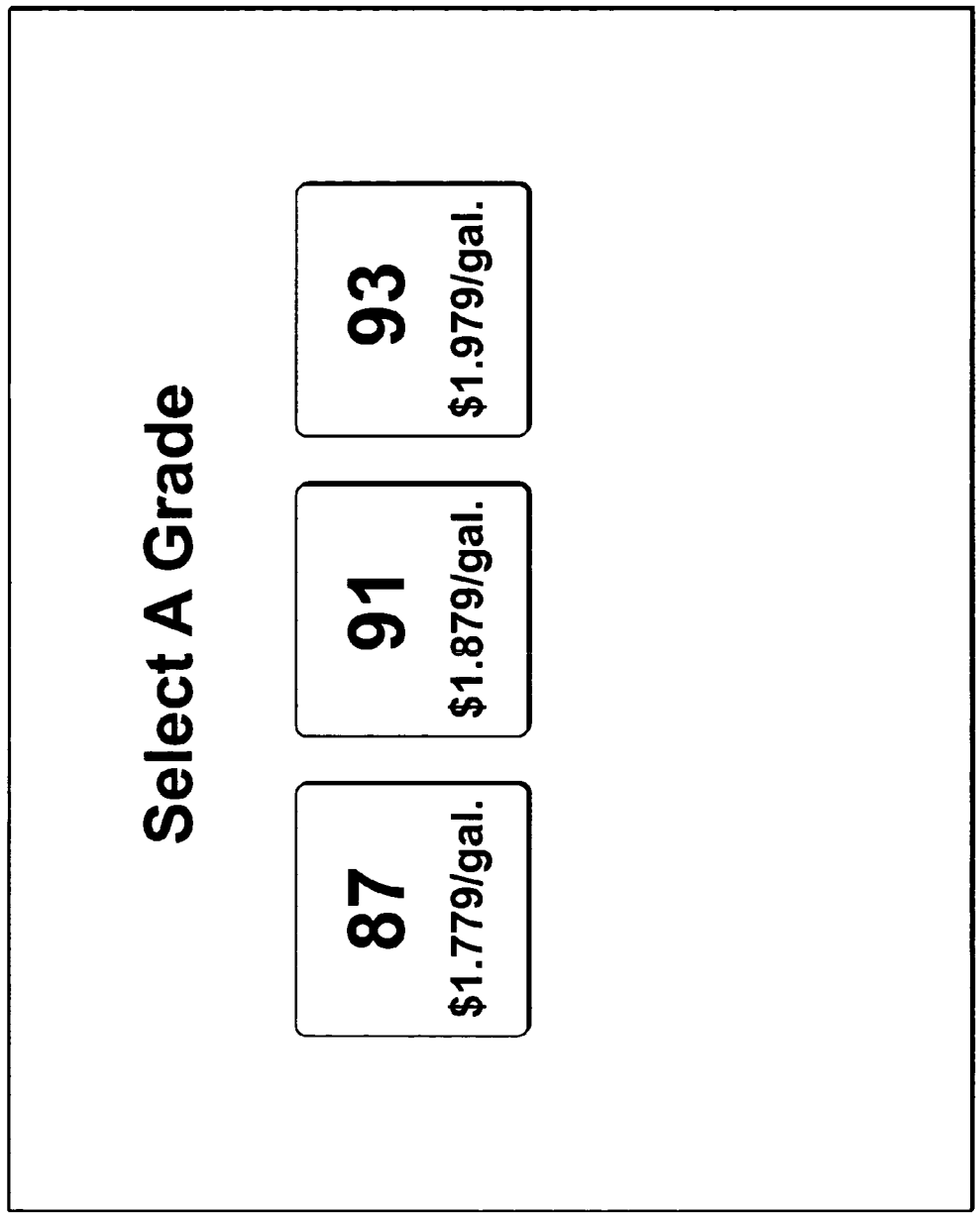

FIGS. 5B, 5C, and 5D depict some of the user-interface screens that can be presented at the Kiosk in FIG. 5A. FIG. 5B depicts a payment type selection screen that gives a consumer the option to select a form of payment from among ATM or debit card, credit or check card, or debit from fuel purchasing account. FIG. 5C depicts a fuel grade selection screen that gives a consumer the option to select a grade of fuel. The fuel grade selection screen can be displayed after a form of payment has been selected. After selecting a fuel grade, a consumer can remove the appropriate nozzle from among nozzles, 507A, 507B and 507C to dispense fuel.

FIG. 5C depicts an account history screen, for example, as presented by a fuel management system Web site. FIG. 5C also depicts other information than that is potentially presented by the fuel management system Web site. For example, an authenticated account holder can also view and edit their account information. An account holder or prospective account holder can access an introduction, obtain information on how the fuel management system operates, list retail locations that support the fuel management system, view information about the company that runs the fuel management system, contact the company that runs the fuel management system, and receive online help. Prospective account holders can also sign-up for a fuel purchasing account.

Figure 3:
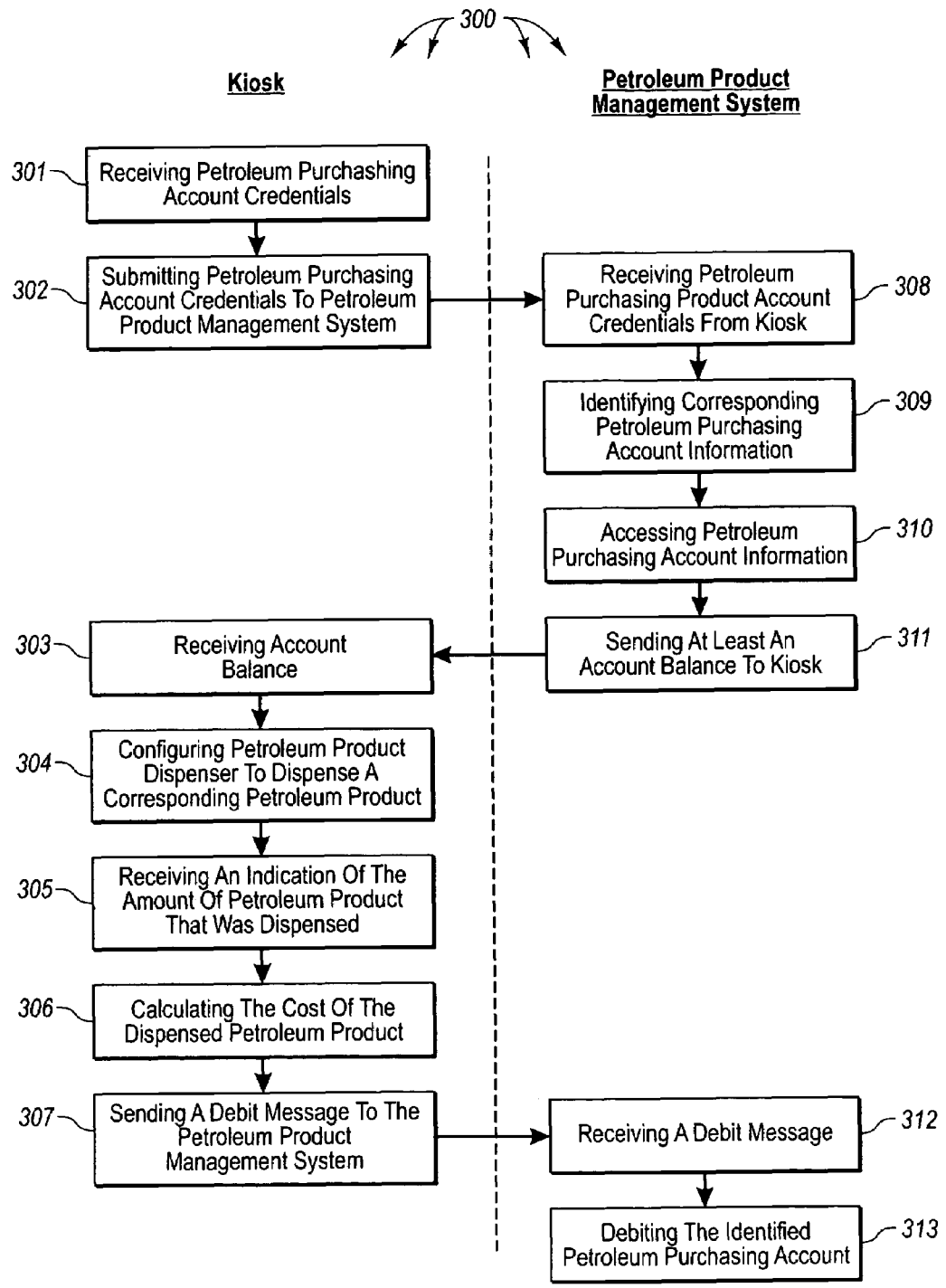
FIG. 3 illustrates an example flowchart of a method for dispensing petroleum products.

FIG. 3 illustrates an example flowchart of a method 300 for dispensing petroleum products. The method 300 will be described with respect to the components and data in computer architecture 100.

Method 300 includes an act of receiving petroleum purchasing account credentials (act 301). For example, kiosk 116 can receive credentials 141 at any of input component 112, keypad 124, or touch screen 122. In some embodiments, credentials 141 includes a telephone number and PIN corresponding to a fuel purchasing account, such as, for example, an account stored in database 107.

It may be that kiosk 116 initially displays a screen similar to that of FIG. 5B. A consumer can select the desired payment method by touching the corresponding payment method icon on touch screen 122. If a consumer selects "debit from fuel purchasing account", the consumer can then be prompted to enter a telephone number and PIN. In response to the prompts, and depending on the configuration of kiosk 116, the consumer can enter a telephone number and PIN at keypad 124, at a virtual keypad displayed at touch screen 122, or at input component 117.

Method 300 includes an act submitting the petroleum purchasing account credentials to a petroleum management system (act 302). For example, kiosk 116 can submit credentials 141 to fuel management module 102. The method 300 includes an act of receiving petroleum purchasing account credentials (act 308). For example, fuel management module 102 can receive credentials 141 from kiosk 116.

Method 300 includes an act of a identifying a corresponding petroleum purchasing account (act 309). For example, based on credentials 141, authorization module 151 can identify an account (e.g., account 108) or fleet account (e.g., fleet account 111) and corresponding sub-account (e.g., sub-account 112) stored in database 107. Thus, when a fleet account is identified, authorization module 151 can also identify the appropriate sub-account.

Method 300 includes an act of accessing petroleum purchasing account information (act 310). For example, account details module 105 and/or financial module 104 can access account information (account history, account balance, etc.) for an account or fleet account (sub-account) stored in database 107 identified by credentials 141. Method 300 includes an act of sending at least an account balance to the kiosk (act 311). For example, fuel management module 102 can send account balance 142 to kiosk 116. Account balance 142 can be the account balance of the account identified by credentials 141.

Method 300 includes an act of receiving an account balance (act 303). For example, kiosk 116 can receive account balance 142 from fuel management module 102. Method 300 includes an act of configuring a petroleum product dispenser to dispense a corresponding petroleum product (act 304). For example, in response to receiving account balance 142, kiosk 116 can present a grade selection screen similar to that of FIG. 5C. A consumer can select the desired grade of fuel by touching the grade icon on touch screen 503. In response to fuel grade selection, kiosk 116 can execute fuel dispenser algorithm 119. Fuel dispenser algorithm 119 can cause activate command 143 to be sent to fuel dispenser 127. Activate command 143 can indicate the selected grade of fuel to fuel dispenser 127.

In response to activate command 143, dispenser configuration module 129 can internal configure fuel dispenser 127 to dispense fuel and external configuration detector 131 can detect the configuration of external controls 132. If the appropriate nozzle has been removed, fuel dispenser 127 allows fuel to be dispensed. The consumer can then dispense fuel into their vehicle. Upon completion of dispensing fuel, fuel dispenser 127 sends dispensing complete indication 144 to kiosk 116.

Method 300 includes an act of receiving an indication of the amount of petroleum product that was dispensed (act 305). For example, kiosk 116 can receive dispensing complete indication 144 that includes the dispensed amount. Method 300 includes an act of calculating the cost of the dispensed petroleum product (act 306). For example, kiosk 116 can calculate the cost of fuel dispensed at fuel dispenser 127.

Method 300 includes an act of sending a debit message to the petroleum management system (act 307). For example, kiosk 116 can send debit message 146 to fuel management module 102. Debit message 146 can include the calculated cost of fuel dispensed at fuel dispenser 127.

Method 300 includes an act of receiving a debit message (act 312). For example, fuel management module 102 can receive debit message 146 from kiosk 116. Method 300 includes an act of debiting the identified petroleum purchasing account (act 313). For example, financial module 104 can debit the account (e.g., account 108) or fleet account (e.g., sub-account 112) identified by credentials 141 by the cost of dispensed fuel calculated at kiosk 116.

Thus, the computer architecture 100 facilitates pay at the pump convenience without incurring card network fees or risk of returned check losses on a per transaction basis. Accordingly, retail locations that utilize compatible kiosks can potentially spread the cost of card network fees and risk of returned check losses across multiple transactions per account holder. As a result, these costs and risks have a reduced impact per transaction and any increase in fuel price due to these costs and risks is significantly reduced. Further, petroleum products can be dispensed attendant-free, further reducing retailer overhead. Thus, retailers are able to offer more competitive selling prices and yet also have higher sales margins.

Figure 2:
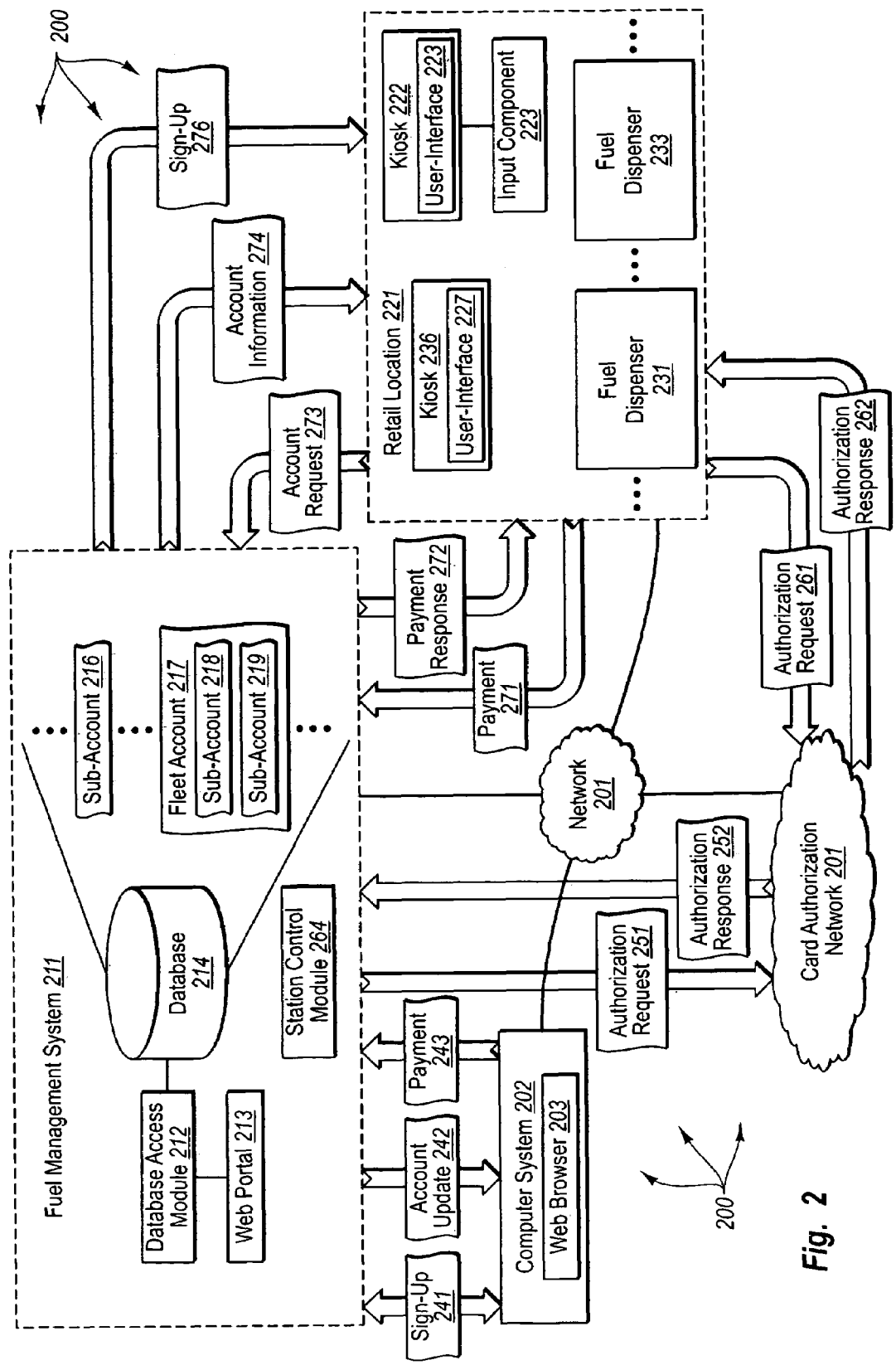
FIG. 2 illustrates a second example computer architecture for managing the dispensing of petroleum products.

FIG. 2 illustrates a second example computer architecture 200 for managing the dispensing of petroleum products. Computer architecture 200 depicts fuel management system 211, computer system 202, retail location 221, and card authorization network 204 communicatively coupled via network 201. Network 201 can be a Wide Area Network ("WAN") or even the Internet. Computer systems connected to network 201 can receive data from and send data to other computer systems connected to network 201. Accordingly, fuel management system 211, computer system 202, kiosks 226 and 222, and computer systems included in card authorization network 204, as well as other connected computer systems (not shown), can create electronic messages and exchange electronic messages over network 201. These electronic messages can be formatted in accordance with various communication protocols as described above.

Computer system 202 includes Web browser 203 that is configured to browse Web pages including Web based content, such as, for example, HyperText Markup Language ("HTML") instructions, XML instructions, audio, video, images, etc. Computer system 202 can be general-purpose home or business personal or laptop computer that has access to the World Wide Web ("WWW").

Fuel management system 211 can include any of modules previously described as being included in fuel management module 102. In some embodiments, the fuel management module 102 interoperates with Web portal 213 (e.g., a Web server) to provide Web based access to the functionality of fuel management system 211. Thus, a user of computer system 202 can direct Web browser 203 to a network address (e.g., a Uniform Resource Identifier ("URI") or Uniform Resource Locator ("URL")) associated with Web portal 203 fuel management system home page.

After accessing the home page, the user can select a sign-up link (e.g., referring briefly to FIG. 5D sign-up 511) and be taken to a sign-up page. The user can enter account information into the fields of the sign-up page to create a fuel purchasing account. Web portal 213 can forward the entered account information to database access module 212, which in turn stores the account information in database 214. Creation of a fuel management account can include the exchange of a number of electronic messages collectively represented as sign-up 211. Through the sign-up page, a user can create an account (e.g., account 216) or a fleet account (e.g., fleet account 217). As previously described, a fleet account can include one or more sub-accounts (e.g., sub-accounts 218 and 219).

After a fuel purchasing account is created, the use can submit a payment (or credit) to the fuel purchasing account such that the fuel purchasing account can subsequently be used to purchase fuel. Payments can be submitted in the form of currency, a paper check or electronically, such as, for, example, electronic funds transfer (automatic clearing house ("ACH") online check, pay pal, etc.), credit card, debit card, etc. as indicated by payment 243.

In some embodiments, electronic funds transfers into an account can be secured using credit cards. For example, a fuel purchasing account holder can submit a credit card number to fuel management system 211. Fuel management system 211 can retain the credit card number and use the credit card number to secure other forms of payment, such as, for example, checks and electronic checks. Thus, when other forms of payments are submitted, the funds from those payments can immediately be made available for the purchase of fuel (e.g., before a submitted check clears).

Currency or paper checks can be processed by an administrator of fuel management system 211 and appropriately credited to the fuel purchasing account.

When the form of payment is a credit or debit card, fuel management system 211 can verify the payment with card authorization network 204. For example, fuel management system 211 can send authorization request 251 (e.g., including a card number and purchase amount) to card authorization network 204. Card authorization network 204 can receive and process authorization request 251. Processing authorization request 251 can include determining if the card has an available credit or sufficient funds of at least the purchase amount. After making the determination, card authorization network 204 can return authorization response 252, indicating whether or not the payment is approved, to fuel management system 211. When the payment is approved, fuel management system 211 can further communicate with card authorization network 204 to debit the card and credit the corresponding fuel purchasing account.

It may be that payment 243 is of an amount sufficient to pay for a multiple fuel purchases (e.g., an amount larger that needed to for a "tank-at-a-time purchase"). Thus, the increase in fuel price due to the card network fee is essentially divided across the multiple purchases. Thus, the increase in fuel price is reduced when compared to pay at the pump mechanisms that incur a card network fee per transaction.

In response to receiving a payment (or some other change to a fuel purchasing account), fuel management system 211 can update the appropriate account information in database 214. Fuel management system 211 can indicate account changes to computer system 202, such as, for example, as update account message 242. Computer system 202 can receive update account message 242 and display the contact of update account message 242 at Web browser 203.

As fuel purchasing account holder with appropriate credentials can also initiate transfer funds between managed accounts. For example, the account holder of account 216 (e.g., a parent) can transfer available funds to some other account in database 214 (e.g., into a child's account). Providing a single payment used to credit multiple accounts further reduces the fees associated with purchasing fuel. For example, submitting a single credit card payment reduces amount of associated card fees.

As depicted, retail location 221 includes kiosk 222 and kiosk 226. Kiosks 222 and 226 can include components similar to kiosk 116 and are both capable of activating fuel dispensers at retail location 221. Kiosk 226 can be in close physical proximity to fuel dispensers 231 and 223 such that a fuel purchasing account holder can activate a fuel dispenser through kiosk 226 and then utilize the activated fuel dispenser to dispense fuel more efficiently. Kiosk 222 can be located further away from fuel dispensers 231 and 233, such as, for example, inside a building at retail location 221.

Fuel dispensers 231 and 233 can be configured similarly to fuel dispenser 127.

In some embodiments, consumers are also able to sign-up for a fuel purchasing account at a kiosk. For example, a consumer can use kiosk 222 to access the fuel management system home page. After accessing the home page, the consumer can select a sign-up link (e.g., 511) and be taken to a sign-up page. User-interface 223 (e.g., a general-purpose or specialized Web browser) can present fields for receiving account information.

The consumer can enter the appropriate account information into the presented fields and send the account information to fuel management system 211. Creation of a fuel management account from kiosk 222 can include the exchange of a number of electronic messages collectively represented as sign-up 276. Generally, entering account information at kiosk 222 is similar to entering account information at computer system 202. It may be that kiosk 222 is equipped with input component 224 (e.g., a keyboard) to make data entry more efficient.

Fuel purchasing account holders can also access account information through a kiosk. For example, a fuel purchasing account holder can log into the fuel management system (e.g., using a telephone number and PIN) at kiosk 226 or 222. Subsequently, the fuel purchasing account holder can access an account information page that causes the submission of account request 273 to fuel management system 211. In response to account request 273, fuel management system 211 can retrieve account information for the appropriate fuel purchasing account. Fuel management system 211 can send the appropriate account information back to the requesting kiosk in account information 274. Account information 274 can include the amount of fuel used over a specified period of time and provides a fuel purchasing account holder with information to budget for future fuel purchases. Similar account information can also be provided to a fuel purchasing account holder a computer system 202.

Fuel purchasing account holders can also submit payments at a kiosk. Payments submitted at a kiosk are processed similar to those submitted at other computer systems (e.g., computer system 202). For example, a fuel purchasing account holder can submit payment 271 to fuel management system 211 from kiosk 222. Kiosk 222 can be configured to accept paper currency and credit and debit cards. Paper currency can be received at an appropriate interface at kiosk 222. Card and debit cards can be received at a card swipe, for example, card swipe 501. When a kiosk has Internet access, a consumer may also initiate an electronic funds transfer.

Alternately, a fuel purchasing account holder can submit cash, in an amount sufficient for multiple fuel purchases, to an attendant at retail location 221. The attendant can then utilize kiosk 222 (or some other, potentially employee only, kiosk) to submit payment 271.

Fuel management system 211 can receive payment 271 and process payment 271 similar to the processing of payment 243. After processing, fuel management system 211 can send payment response 272 back to kiosk 222. Payment response 272 can indicate if payment 271 was accepted and can include an updated account balance for the appropriate fuel purchasing account. When submitting a payment by credit or debit card, fuel purchasing account holders can swipe their card or can enter the card number using input component 224.

As previously described, kiosks can be configured to accept card and debit cards as a form of payment. Referring briefly back to FIG. 5B, when a consumer selects "Pay With Credit Or Check Card", the consumer is then prompted to swipe their card. The kiosk then queries card authorization network 204 to verify the swiped card. For example, kiosk 226 can submit authorization request 261 to card authorization network 204. Card authorization network 204 can process authorization request 261 and return authorization response 262 to kiosk 226. Based on authorization response 262, kiosk 226 may or may not activate the appropriate fuel dispenser.

In some embodiments, fuel management system 211 is also configured to monitor and control retail locations. For example, station control module 264 can remotely monitor and maintain contact with kiosks at a number of different retail locations. Through remote communication with kiosks station control module 264 can update kiosk software modules, reboot kiosks, change fuel prices, monitor fuel sales, and analyze software and hardware. Station control module can also be configured to communicate with other networked devices, such as, for example, signs, at retail locations. For example, station control module can communicate with signs to update fuel prices and/or displayed text remotely. In some embodiments, the desired prices and/or text is entered at fuel management system 211 and then a single command is issued to implement price and/or text changes at all kiosks and signs at a retail location.

Accordingly, embodiments of the present invention provide consumers with a computer generated account wherein funds can be placed using various forms of payment, such as, for example, cash, checks, electronic funds transfers, electronic check, credit/debit cards, for the use of purchasing fuel. Further, the computer generated accounts can maintain a computer generated record of available funds and past fuel purchases. Thus, funds can be received and credited to an account before authorization to purchase fuel is made.

In some embodiments, for example, when payments are submitted through electronic funds transfers and/or electronic checks, overhead (e.g., potential for returned check loses) associated with the transaction is virtually eliminated. In any event, any associated overhead (card fees, charge backs, attend costs, etc) can be spread across multiple fuel purchases thereby reducing the portion of the overhead associated with a single fuel purchase. For example, a consumer can present a human attendant with a cash payment sufficient to purchase multiple tanks of fuel thereby spreading the overhead associated with the human attendant (cash handling costs, security, attendant mistakes, etc.) across the multiple purchases.

Further, through the use of fleet accounts, a fleet account administrator can control the purchase of fuel through fund allocations to various sub-accounts. Similarly, a fuel purchasing account holder that manages multiple accounts can transfer funds between the accounts.

Figure 4:
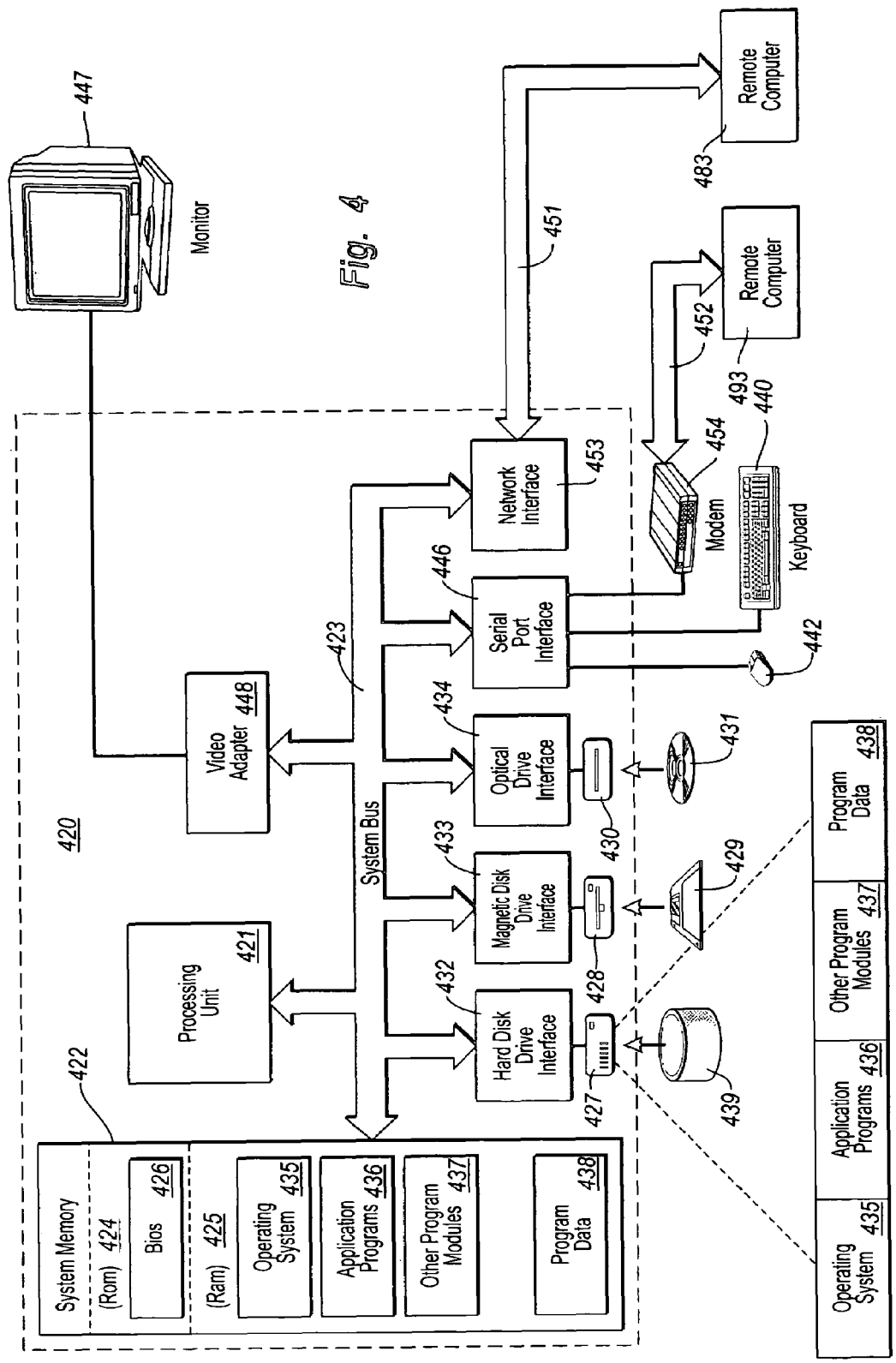
FIG. 4 illustrates a suitable operating environment for the principles of the present invention.

FIG. 4 and the following discussion are intended to provide a brief, general description of a suitable computing environment in which the invention may be implemented. Although not required, the invention can be implemented in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Speakers or other audio output device is also connected to system bus 423 via an audio interface. Other peripheral output devices (not shown), such as, for example, printers, can also be connected to computer system 420.

Computer system 420 is connectable to computer networks, such as, for example, an office-wide or enterprise-wide computer network, a home network, an intranet, and/or the Internet. Computer system 420 can exchange data with external sources, such as, for example, remote computer systems, remote applications, and/or remote databases over such computer networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a computer network (e.g., an Ethernet segment), and remote computer system 483 represents a node of the computer network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem), through which computer system 420 receives data from and/or transmits data to external sources. As depicted in FIG. 4, input/output interface 446 and modem 454 facilitate the exchange of data with remote computer system 493 via link 452. Link 452 represents a portion of a computer network and remote computer system 493 represents a node of the computer network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, fuel management system modules, kiosks modules, and fuel dispenser modules, as well as associated data, including fuel purchasing account information, payments, debits, may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a computer network environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letter Patent is:

1. At a kiosk that is network connectable to a petroleum product management system, the kiosk located at a retail location to control the dispensing of petroleum products at one or more petroleum product dispensers at the retail location, the petroleum product management system located separately from the retail location, the petroleum management system configured to remotely monitor and maintain contact with kiosks at a plurality of different geographically remote retail locations via network communication, a method for dispensing a petroleum product at the retail location, the method comprising:

an act of the kiosk receiving an indication of a petroleum product that is to be purchased at the retail location;

an act of the kiosk receiving account credentials corresponding to a registered petroleum purchasing account for a registered user of the separately located petroleum management system, the registered petroleum purchasing account having an account balance representing funds from previously cleared deposit transactions submitted to the separately located petroleum product management system, the previously cleared deposit transactions electronically depositing funds into the registered petroleum purchasing account, the account balance indicating funds available within the separately located petroleum management system to minimize the risks associated with settling transactions for the purchase of petroleum products without reference to external authorization networks;

an act of the retail location submitting the received account credentials for the registered petroleum purchasing account to the separately located petroleum product management system;

an act of the retail location receiving the account balance for the registered petroleum purchasing account from the separately located petroleum product management system, the separately located petroleum product management system handling petroleum product purchases for a variety of different, geographically remote retail locations, reception of the account balance indicating to the retail location that the registered user has an account with the fuel management system such that payment for purchased petroleum products is to be made from previously cleared funds so as to thereby further indicate to the retail location the minimized risk associated with settling transactions involving the registered user;

an act of the kiosk configuring a petroleum product dispenser to dispense the petroleum product based on the account balance for the petroleum purchasing account;

an act of receiving monitoring from the separately located petroleum management system to monitor the dispensing of the petroleum product in essentially real time to assure that the account balance is sufficient to pay for the dispensed petroleum product as the petroleum product is dispensed so as to prevent the account balance from going below a limit;

an act of receiving an indication that the dispensing of petroleum product is completed resulting in a dispensed petroleum product quantity that was dispensed at the petroleum product dispenser, the indication being either an indication from the fuel management system that the account balance has reached the limit or an indication from the petroleum product dispenser that dispensing is complete;

an act of calculating an amount for the cost of the dispensed petroleum product quantity; and an act of sending a debit message to the separately located petroleum product management system in response to and upon completion of dispensing the petroleum product quantity, the debit message sent to directly debit the calculated amount from the account balance of the registered petroleum purchasing account by transferring the calculated amount out of the registered petroleum purchasing account to settle the transaction for the purchase of the dispensed petroleum product quantity, without reference to any other external authorization networks.

2. The method as recited in claim 1, further comprising:
an act of submitting a payment to the petroleum product management system prior to configuring the petroleum product dispenser to dispense a petroleum product, the amount of the payment being large enough to cover the price of one or more petroleum product purchases; and
an act of receiving an indication that the payment was credited to the petroleum purchasing account.

3. The method as recited in claim 2, wherein the act of submitting a payment to the petroleum product management system comprises an act of submitting a credit or debit card number to the petroleum product management system.

4. The method as recited in claim 2, wherein the act of submitting a payment to the petroleum product management system comprises an act of initiating an electronic funds transfer to the petroleum product management system.

5. The method as recited in claim 2, wherein the act of submitting a payment to the petroleum product management system comprises an act of submitting a cash payment to the petroleum product management system.

6. The method as recited in claim 2, wherein the act of submitting a payment to the petroleum product management system comprises an act of submitting a command that causes funds to be transferred from one petroleum purchasing account to another petroleum purchasing account.

7. The method as recited in claim 1, wherein the act of receiving account credentials corresponding to a petroleum purchasing account comprises an act of receiving a user-id and pass code.

8. The method as recited in claim 1, wherein the act of receiving account credentials corresponding to a petroleum purchasing account comprises an act of receiving credentials that correspond to a fleet account sub-account.

9. The method as recited in claim 1, wherein the act of receiving account credentials corresponding to a petroleum purchasing account comprises an act of receiving account credentials that were submitted from an input device, the input device being selected from among a keypad, a virtual keyboard, and a keyboard.

10. The method as recited in claim 1, wherein the act of submitting the account credentials to the petroleum product management system comprises an act of sending the credentials to a network address corresponding to the petroleum product management system such that the credentials are transferred across the Internet to the petroleum product management system.

11. The method as recited in claim 1, further comprising:
an act of receiving a touch screen selection indicating that payment for a dispensed petroleum product is to be debited from the petroleum purchasing account prior to receiving the account credentials.

12. The method as recited in claim 1, wherein the act of receiving an account balance for the petroleum purchasing account from the petroleum product management system comprises an act of receiving an electronic message that was transferred over the Internet to the kiosk.

13. The method as recited in claim 1, further comprising:
an act of receiving a touch screen selection indicating a fuel grade prior to configuring the petroleum product dispenser.

14. The method as recited in claim 1, wherein the act of sending a debit message to the petroleum product management system comprises an act of sending the debit message to a network address corresponding to the petroleum product management system such that the debit message is transferred across the Internet to the petroleum product management system.

15. The method as recited in claim 1, further comprising:
an act of submitting a request for account information corresponding to the petroleum product purchasing account;
an act of receiving account information for the petroleum product purchasing account from the petroleum product management system; and
an act of presenting the account information at a touch screen.

16. At a petroleum product management system that is network connectable to one or more computer systems, the one or more computer systems including one or more separately located retail location kiosks, each retail location kiosk controlling the dispensing of petroleum products at a retail location, the petroleum management system configured to remotely monitor and maintain contact with retail location kiosks at a plurality of different retail locations via network communication, a method for authorizing the dispensing of a petroleum product at a retail location, the method comprising:
an act of the petroleum product management system receiving account credentials from a kiosk at a retail location, the account credentials being indicative of an attempt to purchase petroleum products at the retail location against the balance of a registered petroleum purchasing account;
an act of the petroleum product management system identifying a registered petroleum purchasing account assigned to the received account credentials, the registered petroleum purchasing account previously registered to the registered user of the petroleum product management system, the registered petroleum purchasing account having an account balance representing funds from previously cleared deposit transactions submitted to the petroleum product management system, the previously cleared deposit transactions electronically depositing funds into the registered petroleum purchasing account, the account balance indicating funds available within the petroleum management system to significantly reduce the risks associated with settling transactions for the purchase of petroleum products without reference to external authorization networks;

an act of the petroleum product management system accessing account information for the assigned registered petroleum purchasing account from an account database;

an act of the petroleum product management system sending at least an account balance for the assigned registered petroleum product purchasing account to the retail location kiosk at the retail location, the account balance indicating to the retail location that the registered user has an account with fuel management system such that payment for purchased petroleum products is to be made from previously cleared funds so as to further thereby indicate to the retail location the minimized risk associated with settling transactions involving the registered user;

an act of the petroleum product management system monitoring dispensing of the petroleum product at the retail location in essentially real time to assure that the account balance is sufficient to pay for the dispensed petroleum product as the petroleum product is dispensed so as to prevent the account balance from going below a limit;

if the account balance reaches the limit:
an act of sending an indication to the retail location that dispensing of the petroleum product is complete;

an act of the petroleum product management system receiving a debit message from the retail location kiosk at the retail location in response to and upon completion of dispensing petroleum product at the retail location, the debit message for debiting a calculated cost amount for dispensed petroleum product, dispensed at the retail location, from the account balance of the assigned registered petroleum purchasing account; and an act of debiting the calculated amount from the assigned registered petroleum purchasing account in response to receiving the debit message by transferring the calculated amount out of the assigned registered petroleum purchasing account to settle the transaction for the purchase of the dispensed petroleum product quantity, without reference to any external authorization networks, wherein the petroleum product management system is configured to debit the assigned registered petroleum purchasing account for petroleum product purchases made at any of a variety of different, geographically remote retail locations.

17. The method as recited in claim 16, further comprising:
an act of receiving a payment from a computer system, the amount of the payment being large enough to cover the price of one or more petroleum product purchases; and
an act of crediting the petroleum purchasing account by the amount of the payment.

18. The method as recited in claim 17, wherein the act of receiving a payment from a computer system comprises an act of receiving a payment from a kiosk.

19. The method as recited in claim 17, wherein the act of receiving a payment from a computer system comprises an act of receiving a transfer of funds from a second fuel purchasing account.

20. The method as recited in claim 16, wherein the act of receiving account credentials from a kiosk comprises an act of receiving an electronic message, containing the account credentials, that was transferred over the Internet.

21. The method as recited in claim 16, wherein the act of receiving account credentials from a kiosk comprises an act of receiving a user-id and pass code.

22. The method as recited in claim 16, wherein the act of receiving account credentials from a kiosk comprises an act of receiving credentials corresponding to a fleet account sub-account.

23. The method as recited in claim 16, wherein the act of sending at least an account balance for the petroleum purchasing account to the kiosk comprises an act of sending the account balance to an electronic address corresponding to a kiosk such that the account balance is transferred across the Internet to the kiosk.

24. The method as recited in claim 16, wherein the an act of sending at least an account balance for the petroleum purchasing account to the kiosk comprises an act of sending an activating command for activating advertisements at a kiosk touch screen along with the account balance.

25. The method as recited in claim 16, wherein the act of debiting the petroleum purchasing account by the specified amount in response to receiving the debit message comprises an act of debiting the balance of fleet account.

26. The method as recited in claim 16, further comprising:
an act of receiving a Web based account sign-up request from a computer system;
an act sending a Web based account sign-up screen to the computer system;
an act of receiving account information that was entered at the Web based account sign-up screen; and
an act of creating a petroleum purchasing account based on the received account information.

27. The method as recited in claim 16, further comprising:
an act of receiving a request for account information corresponding to the petroleum purchasing account; and
an act of sending account history information in response to the request.

28. A computer program product for use at a kiosk that is network connectable to a petroleum product management system, the kiosk located at a retail location to control the dispensing of petroleum products at one or more petroleum product dispensers at the retail location, the petroleum product management system located separately from the retail location, the petroleum management system configured to remotely monitor and maintain contact with kiosks at a plurality of different geographically remote retail locations via network communication, the computer program product of implementing a method for dispensing a petroleum product at the retail location, the computer program product comprising one or more computer-readable media have stored thereon computer-executable instructions that, when executed by a processor, cause the kiosk to perform the following:

receive, at the kiosk, an indication of a petroleum product that is to be purchased at the retail location;
receive, at the kiosk, account credentials corresponding to a registered petroleum purchasing account for a registered user of the separately located petroleum management system, the registered petroleum purchasing account having an account balance representing funds from previously cleared deposit transactions submitted to the separately located petroleum product management system, the previously cleared deposit transactions electronically depositing funds into the registered petroleum purchasing account, the account balance indicating funds available within the separately located petroleum management system to minimize the risks associated with settling transactions for the purchase of petroleum products without reference to external authorization networks;

submit, by the retail location, the received account credentials for the registered petroleum purchasing account to the separately located petroleum product management system;

receive, at the retail location, the account balance for the registered petroleum purchasing account from the separately located petroleum product management system, the separately located petroleum product management system handling petroleum product purchases for a variety of different, geographically remote retail locations, reception of the account balance indicating to the retail location that the registered user has an account with the fuel management system such that payment for purchased petroleum products is to be made from previously cleared funds so as to thereby further indicate to the retail location the minimized risk associated with settling transactions involving the registered user;

configure, at the kiosk, a petroleum product dispenser to dispense the petroleum product based on the account balance for the petroleum purchasing account;

receive monitoring from the separately located petroleum management system to monitor the dispensing of the petroleum product in essentially real time to assure that the account balance is sufficient to pay for the dispensed petroleum product as the petroleum product is dispensed so as to prevent the account balance from going below a limit;

receive an indication that the dispensing of petroleum product is completed resulting in a dispensed petroleum product quantity that was dispensed at the petroleum product dispenser, the indication being either an indication from the fuel management system that the account balance has reached the limit or an indication from the petroleum product dispenser that dispensing is complete;

calculate an amount for the cost of the dispensed petroleum product quantity; and send a debit message to the separately located petroleum product management system in response to and upon completion of dispensing the petroleum product quantity, the debit message sent to directly debit the calculated amount from the account balance of the registered petroleum purchasing account by transferring the calculated amount out of the registered petroleum purchasing account to settle the transaction for the purchase of the dispensed petroleum product quantity, without reference to any other external authorization networks.

29. The computer program product as recited in claim 28, further comprising computer-executable instructions that, when executed by a processor, cause the kiosk to perform the following:

submit a payment to the petroleum product management system prior to configuring the petroleum product dispenser to dispense a petroleum product, the amount of the payment being large enough to cover the price of one or more petroleum product purchases; and receive an indication that the payment was credited to the petroleum purchasing account.

30. The computer program product as recited in claim 29, wherein the computer-executable instructions that, when executed, cause the kiosk to submit a payment to the petroleum product management system comprise computer-executable instructions that, when executed, cause the kiosk to submit a credit or debit card number to the petroleum product management system.

31. The computer program product as recited in claim 29, wherein the computer-executable instructions that, when executed, cause the kiosk to submit a payment to the petroleum product management system comprise computer-executable instructions that, when executed, cause the kiosk to initiate an electronic funds transfer to the petroleum product management system.

32. The computer program product as recited in claim 29, wherein the computer-executable instructions that, when executed, cause the kiosk to submit a payment to the petroleum product management system comprise computer-executable instructions that, when executed, cause the kiosk to receive a cash payment.

33. The computer program product as recited in claim 29, wherein the computer-executable instructions that, when executed, cause the kiosk to submit a payment to the petroleum product management system comprise computer-executable instructions that, when executed, cause the kiosk to submit a command for transferring funds from one petroleum purchasing account to another petroleum purchasing account.

34. The computer program product as recited in claim 28, wherein the computer-executable instructions that, when executed, cause the kiosk to receive account credentials corresponding to a petroleum purchasing account comprise computer-executable instructions that, when executed, cause the kiosk to receive a user-id and passcode.

35. The computer program product as recited in claim 28, wherein the computer-executable instructions that, when executed, cause the kiosk to receive account credentials corresponding to a petroleum purchasing account comprise computer-executable instructions that, when executed, cause the kiosk to receive credentials for a fleet account.

36. A system for authorizing petroleum product purchases and tracking petroleum product purchases made at any of a number of different geographically remote retail locations that each have one or more petroleum product dispensers, the system comprising:

a centralized fuel management system configured to authorize petroleum product purchases and facilitate user tracking of individual purchases, the centralized fuel management system including:

a web portal having a sign-up module for creating new petroleum purchasing accounts for users, wherein the sign-up module is adapted to receive account credentials input for identification of a respective registered petroleum purchasing account;

an account details module for enabling a user associated with the registered petroleum purchasing account to access the registered petroleum purchasing account, wherein access is provided when the user inputs the account credentials received by the sign-up module to create the registered petroleum purchasing account, and wherein the account details module provides the user with access to data that includes a prepaid account balance as well as purchase history information that includes itemized information on past petroleum product purchases;

a database storing account information for the registered petroleum purchasing account, wherein the account information stored by the database includes the account credentials, the prepaid account balance, and the purchase history information; and an authorization module for receiving the account credentials from any of the different, geographically remote retail locations, the account credentials being those entered into the sign-up module and being indicative of an attempt to purchase petroleum products at a respective retail location against the prepaid account balance, the authorization module being configured to identify the registered petroleum purchasing account in the database using the account credentials and determine a sufficiency of funds for requested fuel purchases, such that each of account authorization, sign-up, and itemized purchase history information are controlled by the same, central fuel management system; and a financial module configured to:
- monitor dispensing of the petroleum product at the retail location in essentially real time to assure that the account balance is sufficient to pay for the dispensed petroleum product as the petroleum product is dispensed so as to prevent the account balance from going below a limit;
- send an indication to the retail location that dispensing of the petroleum product is complete if the account balance reaches the limit;
- debiting a calculated amount from the assigned registered petroleum purchasing account in response to receiving a debit message by transferring a calculated amount out of the assigned registered petroleum purchasing account to settle the transaction for the purchase of the dispensed petroleum product quantity, without reference to any external authorization networks, wherein the petroleum product management system is configured to debit the assigned registered petroleum purchasing account for petroleum product purchases made at any of a variety of different, geographically remote retail locations.

37. The system as recited in claim 36, further comprising a financial module for receiving prepayments for deposit into the registered petroleum purchasing account, and for receiving debits from any of the different, geographically remote retail locations and thereafter debiting the registered petroleum purchasing account, such that the same central fuel management system also controls prepayments and purchase debits.

38. The system as recited in claim 37, wherein the financial module is further configured to secure prepayments using credit cards, such that a credit card is used to secure one or more other forms of prepayment into the registered petroleum purchasing account, thereby making funds available in the registered petroleum purchasing account before the prepayment from the one or more other forms of prepayment clear.

39. The system as recited in claim 36, further comprising a station control module for updating software in petroleum product dispensers and changing prices of petroleum products at the retail locations, such that the same central fuel management system also controls updating of petroleum product dispensers.

40. The system as recited in claim 36, wherein the account details module is further adapted to present to a user, upon entering the account credentials, an amount of petroleum products used over a defined period of time, and budgeting information for future petroleum product purchases.

* * * * *

UNITED STATES PATENT AND TRADEMARK OFFICE
CERTIFICATE OF CORRECTION

PATENT NO.      : 7,478,747 B2
APPLICATION NO. : 11/064276
DATED           : January 20, 2009
INVENTOR(S)     : Call et al.

It is certified that error appears in the above-identified patent and that said Letters Patent is hereby corrected as shown below:

Drawings
Sheet 2, replace the current drawing of figure 2 with the present one. In which the card authorization 204 has been corrected, Kiosk 226 has been corrected, and input component 224 has been corrected.

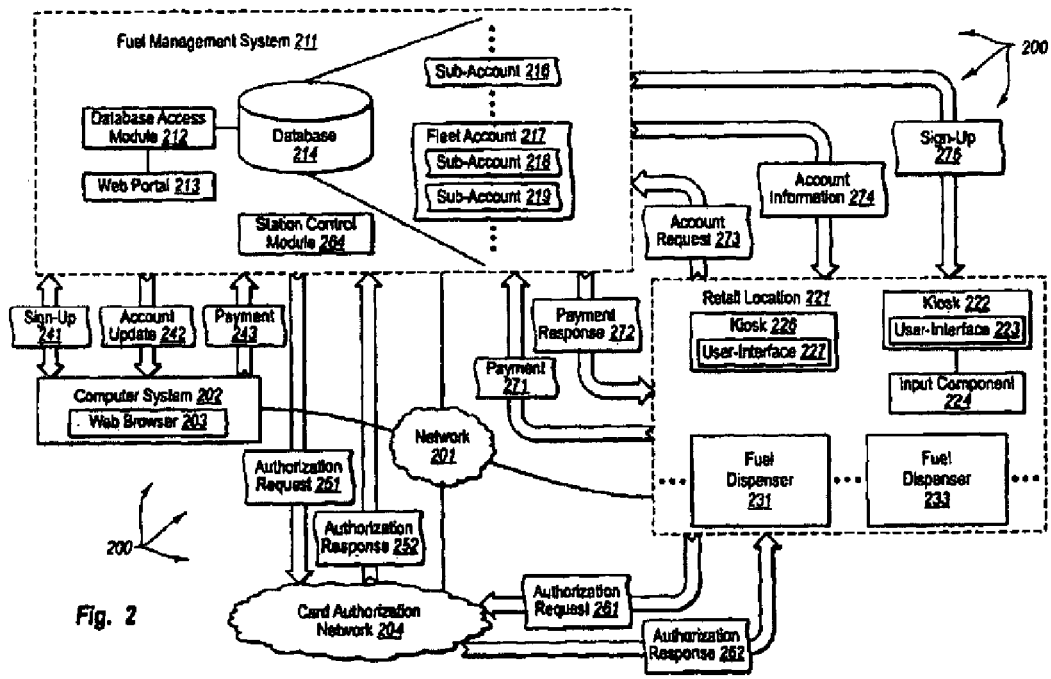

Column 7
Line 58, change "can sent" to --can be sent--

Column 10
Line 5, change "internal" to --internally--

UNITED STATES PATENT AND TRADEMARK OFFICE
CERTIFICATE OF CORRECTION

PATENT NO.         : 7,478,747 B2
APPLICATION NO.    : 11/064276
DATED              : January 20, 2009
INVENTOR(S)        : Call et al.

It is certified that error appears in the above-identified patent and that said Letters Patent is hereby corrected as shown below:

<u>Column 12</u>
Line 25, change "223" to --233--

Signed and Sealed this

Fifteenth Day of December, 2009

David J. Kappos
*Director of the United States Patent and Trademark Office*